US012167047B2

(12) United States Patent
Ding et al.

(10) Patent No.: US 12,167,047 B2
(45) Date of Patent: Dec. 10, 2024

(54) NEURAL NETWORK-BASED DEBLOCKING FILTERS

(71) Applicant: TENCENT AMERICA LLC, Palo Alto, CA (US)

(72) Inventors: Ding Ding, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 77 days.

(21) Appl. No.: 18/080,201

(22) Filed: Dec. 13, 2022

(65) Prior Publication Data

US 2023/0224505 A1 Jul. 13, 2023

Related U.S. Application Data

(60) Provisional application No. 63/299,227, filed on Jan. 13, 2022.

(51) Int. Cl.
| | |
|---|---|
| *H04N 19/86* | (2014.01) |
| *G06N 3/08* | (2023.01) |
| *H04N 19/136* | (2014.01) |
| *H04N 19/167* | (2014.01) |
| *H04N 19/176* | (2014.01) |

(Continued)

(52) U.S. Cl.
CPC .............. *H04N 19/86* (2014.11); *G06N 3/08* (2013.01); *H04N 19/136* (2014.11); *H04N 19/167* (2014.11); *H04N 19/176* (2014.11); *H04N 19/42* (2014.11); *H04N 19/80* (2014.11)

(58) Field of Classification Search
CPC ........ H04N 19/86; H04N 19/80; H04N 19/14; H04N 19/117
See application file for complete search history.

(56) References Cited

U.S. PATENT DOCUMENTS

| 11,265,540 | B2 * | 3/2022 | Na ......................... G06N 5/04 |
| 11,265,549 | B2 * | 3/2022 | Salehifar ............ H04N 19/176 |
| 11,438,632 | B2 * | 9/2022 | Yin ........................ H04N 19/70 |

(Continued)

OTHER PUBLICATIONS

International Search Report dated Apr. 5, 2023 in International Application No. PCT/US22/52943.

(Continued)

*Primary Examiner* — Boubacar Abdou Tchoussou
(74) *Attorney, Agent, or Firm* — Sughrue Mion, PLLC

(57) ABSTRACT

A method and apparatus for reducing artifacts in a compressed image using a neural-network based deblocking filter. The method may include receiving at least one reconstructed image, wherein each reconstructed image comprises one or more reconstructed blocks and extracting boundary areas associated with boundaries of the one or more reconstructed blocks in the at least one reconstructed image. The extracted boundary areas may be input in a trained deblocking model to generate boundary areas having reduced artifacts and the trained deblocking mode is trained on training data based on estimated compression by a neural image compression (NIC) network. The edge areas associated with the generated boundary areas may be removed; and at least one reconstructed image with reduced artifacts may be generated based on the generated boundary areas.

17 Claims, 12 Drawing Sheets

(51) Int. Cl.
*H04N 19/42* (2014.01)
*H04N 19/80* (2014.01)

(56) References Cited

U.S. PATENT DOCUMENTS

| | | | | |
|---|---|---|---|---|
| 11,627,316 | B2* | 4/2023 | Kim | H04N 19/176 375/240.12 |
| 11,631,199 | B2* | 4/2023 | Ikai | H04N 19/119 382/232 |
| 11,716,469 | B2* | 8/2023 | Li | H04N 19/132 375/240.03 |
| 11,778,213 | B2* | 10/2023 | Wang | H04N 19/436 375/240.02 |
| 2005/0089215 | A1 | 4/2005 | Staelin et al. | |
| 2009/0034622 | A1 | 2/2009 | Huchet et al. | |
| 2016/0360202 | A1 | 12/2016 | Xu et al. | |
| 2019/0289327 | A1* | 9/2019 | Lin | G06N 3/045 |
| 2020/0213587 | A1* | 7/2020 | Galpin | H04N 19/117 |
| 2020/0244997 | A1* | 7/2020 | Galpin | G06N 3/084 |
| 2021/0012537 | A1* | 1/2021 | Xu | H04N 19/136 |
| 2022/0141456 | A1* | 5/2022 | Galpin | G06N 3/045 375/240.02 |
| 2023/0007246 | A1* | 1/2023 | Li | G06N 3/04 |
| 2023/0044532 | A1* | 2/2023 | Dinh | H04N 19/80 |
| 2023/0071018 | A1* | 3/2023 | Tang | H04N 19/117 |
| 2023/0188713 | A1* | 6/2023 | Bordes | H04N 19/117 375/240.02 |

OTHER PUBLICATIONS

Written Opinion dated Apr. 5, 2023 in International Application No. PCT/US22/52943.

* cited by examiner

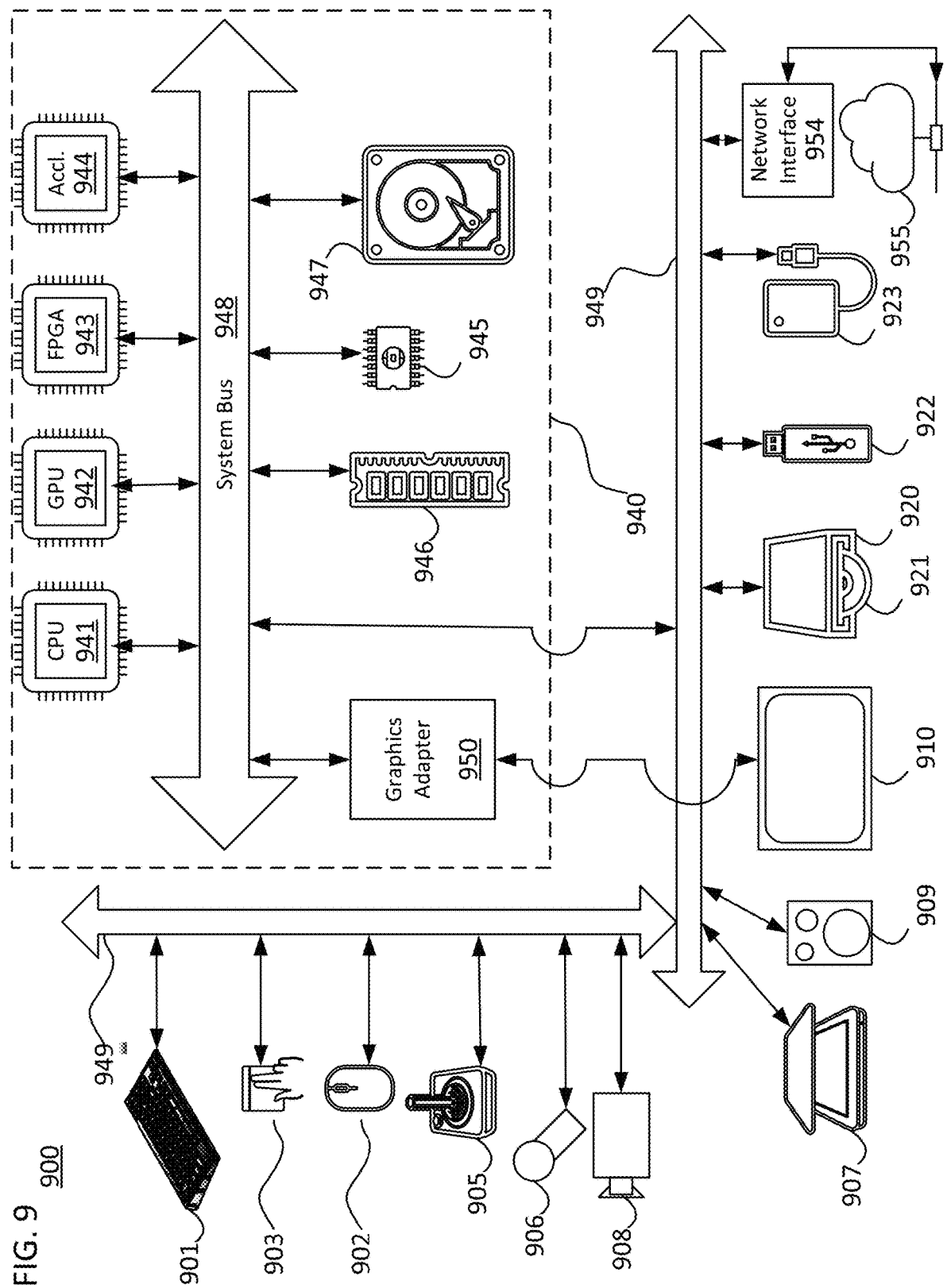

NEURAL NETWORK-BASED DEBLOCKING FILTERS

CROSS REFERENCE TO RELATED APPLICATION(S)

This application is based on and claims priority to U.S. Provisional Patent Application No. 63/299,227, filed on Jan. 13, 2022, the disclosure of which is incorporated by reference herein in its entirety.

FIELD

Embodiments of the present disclosure relate to neural network based deblocking filters for the block-wise neural image compression (NIC).

BACKGROUND

In related art, block-based intra-prediction and residual coding mechanism has been proven highly effective for compressing image frames in modern video coding systems, such as in HEVC and VVC standards. The entire images are partitioned into coding tree units (CTU) first. For each CTU, it can be partitioned into blocks of various sizes, and a prediction block is generated by copying the boundary pixels of previous compressed blocks along a variety of angular directions, and then the residuals between the original block and the prediction block are compressed. Residuals may be much more efficiently encoded than the original pixels, and better coding performance can be achieved.

ISO/IEC MPEG (JTC 1/SC 29/WG 11) has been actively searching for potential needs for standardization of future video coding technology. ISO/IEC JPEG has established JPEG-AI group focusing on AI-based end-to-end neural image compression using Deep Neural Networks (DNN). Big companies like Google has funded specialized research projects for NIC. The Chinese AVS standard has also formed AVS-AI special group to work on neural image and video compression technologies. The success of recent approaches has brought more and more industrial interests in advanced neural image and video compression methodologies.

SUMMARY

According to an aspect of the disclosure, a method for reducing artifacts in a compressed image using a neural-network based deblocking filter may be provided. The method may be executed by at least one processor and may include receiving at least one reconstructed image, wherein each reconstructed image comprises one or more reconstructed blocks; extracting boundary areas associated with boundaries of the one or more reconstructed blocks in the at least one reconstructed image; inputting the extracted boundary areas in a trained deblocking model to generate artifact reduced boundary areas; removing edge areas associated with the artifact reduced boundary areas; and generating at least one reduced artifact reconstructed image based on the artifact reduced boundary areas.

According to an aspect of the disclosure, an system for reducing artifacts in a compressed image using a neural-network based deblocking filter may be provided. The system may include at least one memory configured to store computer program code; and at least one processor configured to access the computer program code and operate as instructed by the computer program code. The program code may include receiving code configured to cause the at least one processor to receive at least one reconstructed image, wherein each reconstructed image comprises one or more reconstructed blocks; extracting code configured to cause the at least one processor to extract boundary areas associated with boundaries of the one or more reconstructed blocks in the at least one reconstructed image; inputting code configured to cause the at least one processor to input the extracted boundary areas in a trained deblocking model to generate artifact reduced boundary areas; removing code configured to cause the at least one processor to remove edge areas associated with the artifact reduced boundary areas; and generating code configured to cause the at least one processor to generate at least one reduced artifact reconstructed image based on the artifact reduced boundary areas.

According to an aspect of the disclosure, a non-transitory computer readable medium that is configured to, when executed by at least one processor, cause the at least one processor to implement a neural-network based deblocking filter that receives at least one reconstructed image, wherein each reconstructed image comprises one or more reconstructed blocks; extracts boundary areas associated with boundaries of the one or more reconstructed blocks in the at least one reconstructed image; inputs the extracted boundary areas in a trained deblocking model to generate artifact reduced boundary areas; removes edge areas associated with the artifact reduced boundary areas; and generates at least one reduced artifact reconstructed image based on the artifact reduced boundary areas.

BRIEF DESCRIPTION OF THE DRAWINGS

Further features, the nature, and various advantages of the disclosed subject matter will be more apparent from the following detailed description and the accompanying drawings in which:

FIG. 9 is a diagram of a computer system suitable for implementing embodiments of the present disclosure.

DETAILED DESCRIPTION

As stated above, organizations are actively searching for potential needs for standardization focusing on AI-based end-to-end neural image compression using Deep Neural Networks (DNN).

Figure 1:
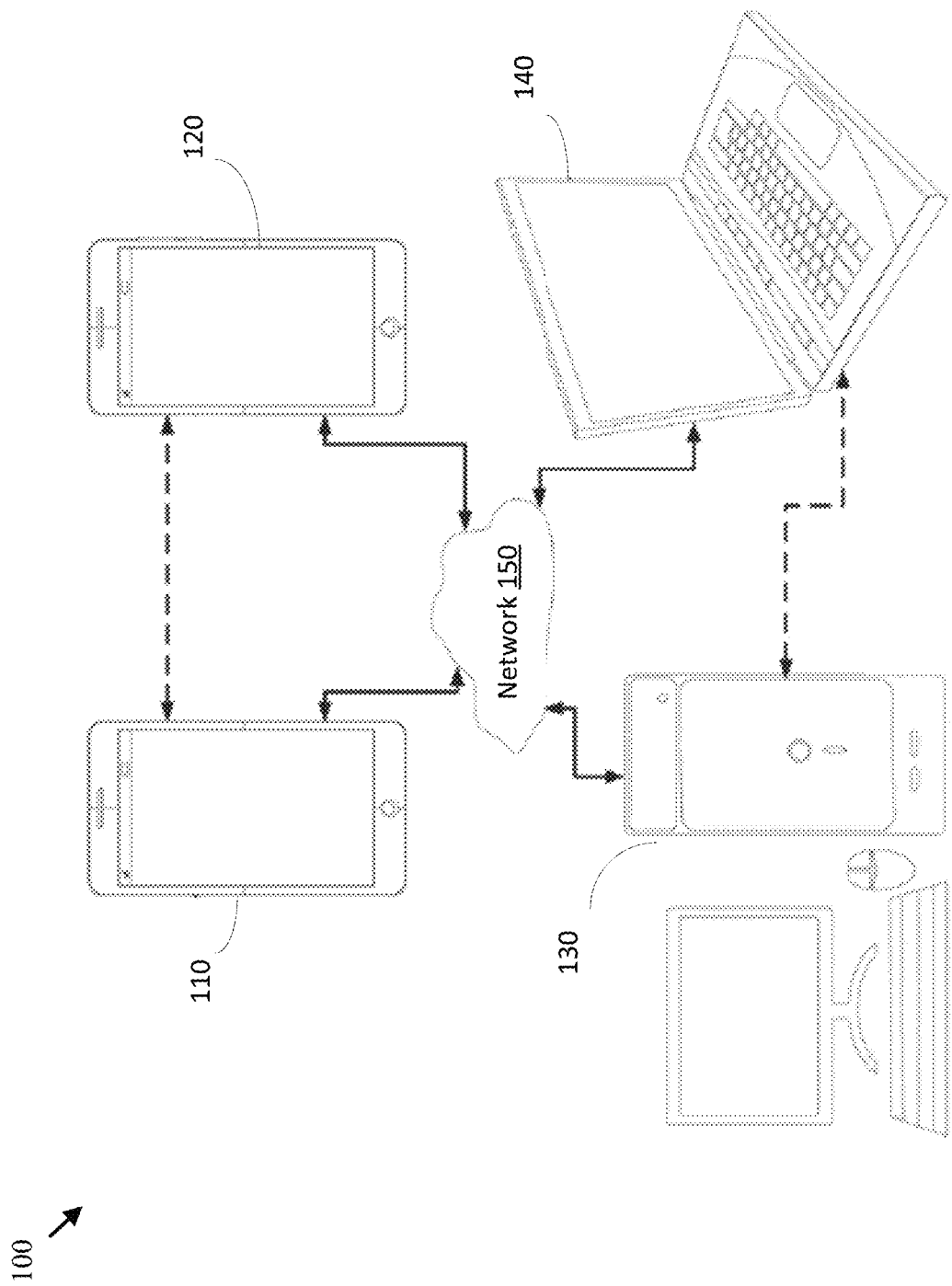
FIG. 1 is a simplified block diagram of a communication system, according to an embodiment.

FIG. 1 illustrates a simplified block diagram of a communication system 100 according to an embodiment of the present disclosure. The communication system 100 may include at least two terminals 140-130 interconnected via a network 150. For unidirectional transmission of data, a first terminal 140 may code video data at a local location for transmission to the other terminal 130 via the network 150. The second terminal 130 may receive the coded video data of the other terminal from the network 150, decode the coded data and display the recovered video data. Unidirectional data transmission may be common in media serving applications and the like.

FIG. 1 illustrates a second pair of terminals 110, 120 provided to support bidirectional transmission of coded video that may occur, for example, during videoconferencing. For bidirectional transmission of data, each terminal 110, 120 may code video data captured at a local location for transmission to the other terminal via the network 150. Each terminal 110, 120 also may receive the coded video data transmitted by the other terminal, may decode the coded data and may display the recovered video data at a local display device.

In FIG. 1, the terminals 140-120 may be illustrated as servers, personal computers and smart phones but the principles of the present disclosure are not so limited. Embodiments of the present disclosure find application with laptop computers, tablet computers, media players and/or dedicated video conferencing equipment. The network 150 represents any number of networks that convey coded video data among the terminals 140-120, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 may be immaterial to the operation of the present disclosure unless explained herein below.

Figure 2:
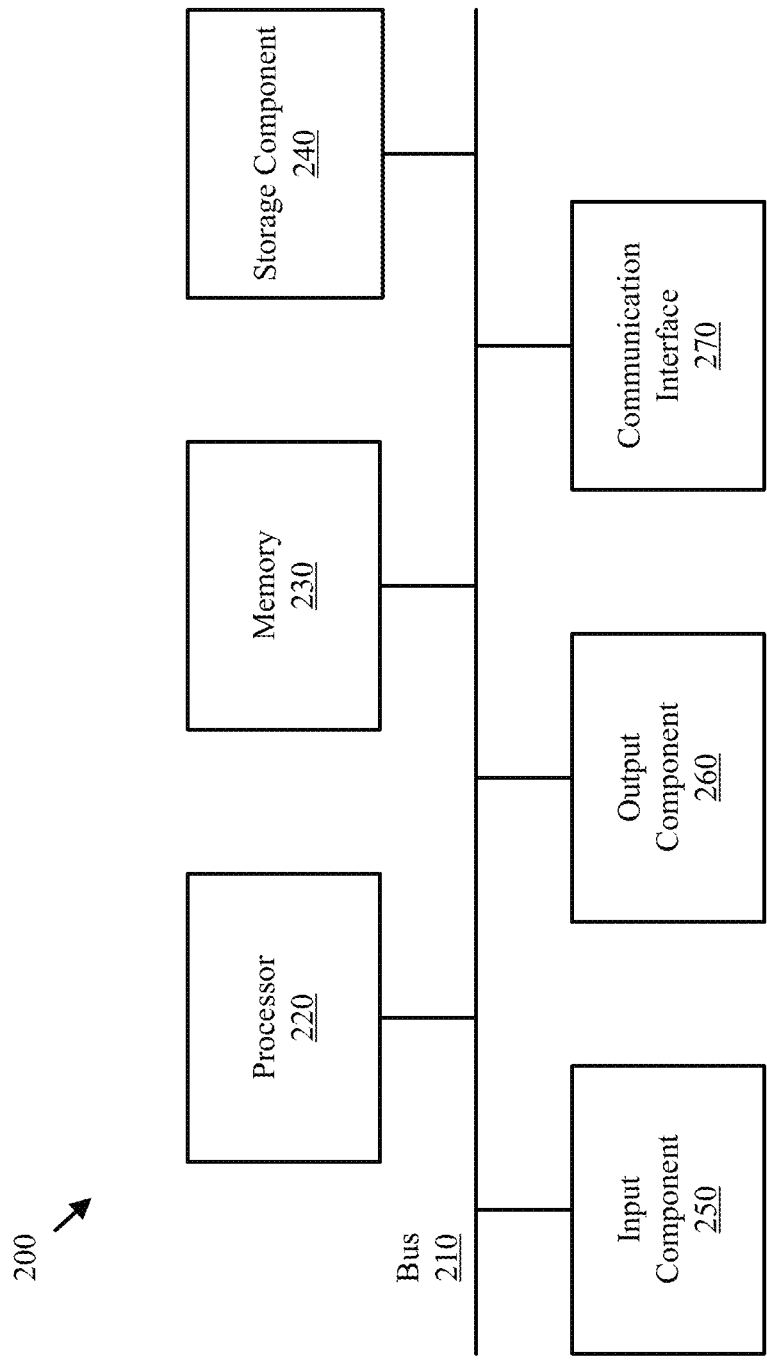
FIG. 2 is a block diagram of example components of one or more devices of FIG. 1.

FIG. 2 is a block diagram of example components of one or more devices of FIG. 1.

A device 200 may correspond to the any one of the terminals 110-140. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory (230) and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Given an input image x, the target of NIC is to use the image x as the input to a DNN encoder to compute a compressed representation $\hat{x}$ that is compact for storage and transmission, and then, use $\hat{x}$ as the input to a DNN decoder to reconstruct an image x. Some NIC methods take a Variational Auto-Encoder (VAE) structure, where the DNN encoders directly use the entire image x as its input, which is passed through a set of network layers that work like a black box to compute the output representation x. Correspondingly, the DNN decoders take the entire representation x̂ as its input, which is passed through another set of network layers that work like another black box to compute the reconstructed x.

Deblocking Filter in HEVC-Boundary Strength Derivation

In HEVC, a deblocking filter process may be performed for each CU in the same order as the decoding process. First vertical edges may be filtered (horizontal filtering) then horizontal edges may be filtered (vertical filtering). Filtering may be applied to 8x8 block boundaries which are determined to be filtered, both for luma and chroma components. In some embodiments, the 4x4 block boundaries may not processed in order to reduce the complexity.

The boundary strength (Bs) reflects how strong a filtering process may be needed for the boundary. A value of 2 for Bs may indicate strong filtering, 1 may indicate weak filtering and 0 may indicate no deblocking filtering.

Figure 3A:
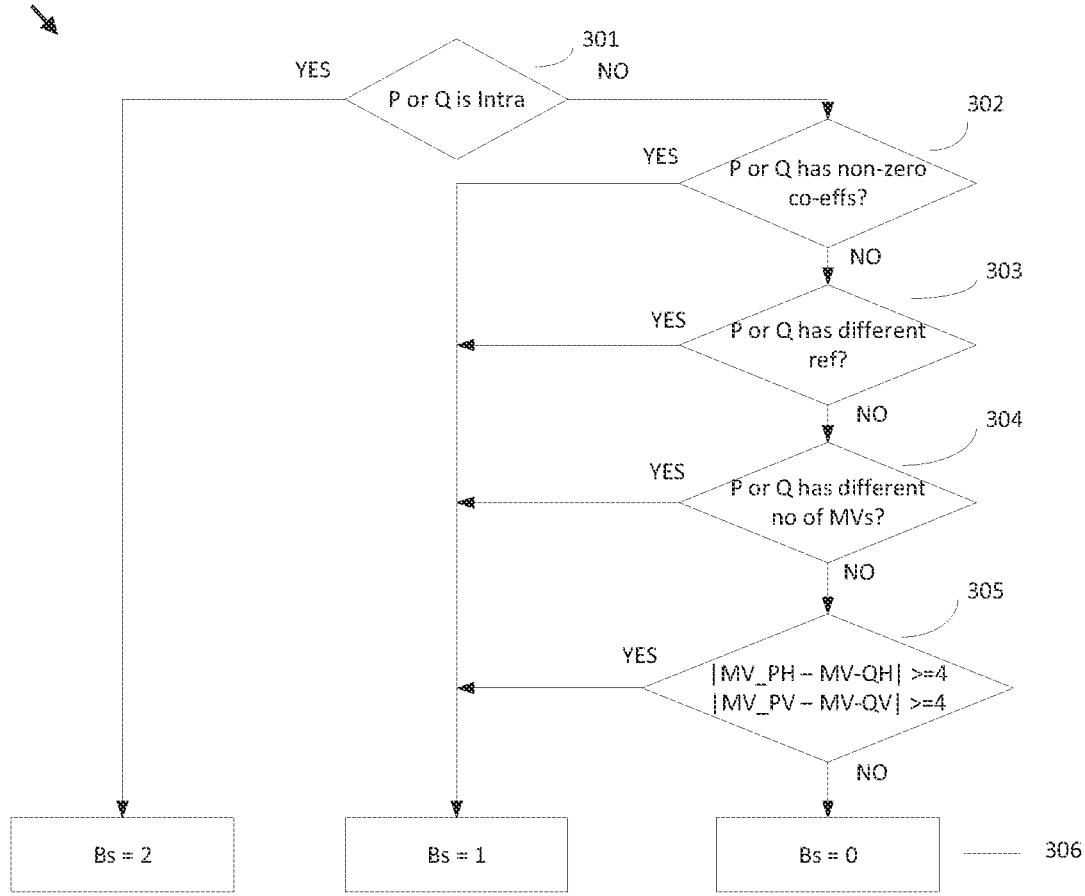
FIG. 3A is a flowchart of an exemplary boundary strength derivation process, according to an embodiment.

In some embodiments, P and Q may be defined as blocks which are involved in the filtering, where P may represent the block located to the left (vertical edge case) or above (horizontal edge case) the boundary and Q may represent the block located to the right (vertical edge case) or below (horizontal edge case) the boundary. FIG. 3A may illustrate a process 300 on how the Bs value may be calculated based on the intra coding mode, the existence of non-zero transform coefficients, reference picture, number of motion vectors and motion vector difference. As an example, when the MV difference is below a threshold T, Bs is equal to 0. The threshold T is set to 1 pixel. In HEVC, the MV precision is ¼ pixel, and the MV difference threshold is set to 4. In VTM, the MV precision is 1/16, and the MV difference is set to 16.

In some embodiments, Bs may be calculated on a 4x4 block basis, but it is re-mapped to an 8x8 grid. The maximum of the two values of Bs which correspond to 8 pixels consisting of a line in the 4x4 grid may be selected as the Bs for boundaries in the 8x8 grid.

Deblocking Filter in VVC

In the VTM5, deblocking filtering process is mostly the same to those in HEVC. However, the following modifications are added—the filter strength of the deblocking filter dependent of the averaged luma level of the reconstructed samples; deblocking tC table extension; stronger deblocking filter for luma; stronger deblocking filter for chroma; and luma deblocking on 4x4 sample grid, and chroma deblocking on 8x8 sample grid.

Filter Strength Dependent on Reconstructed Average Luma Level

Figure 3B:
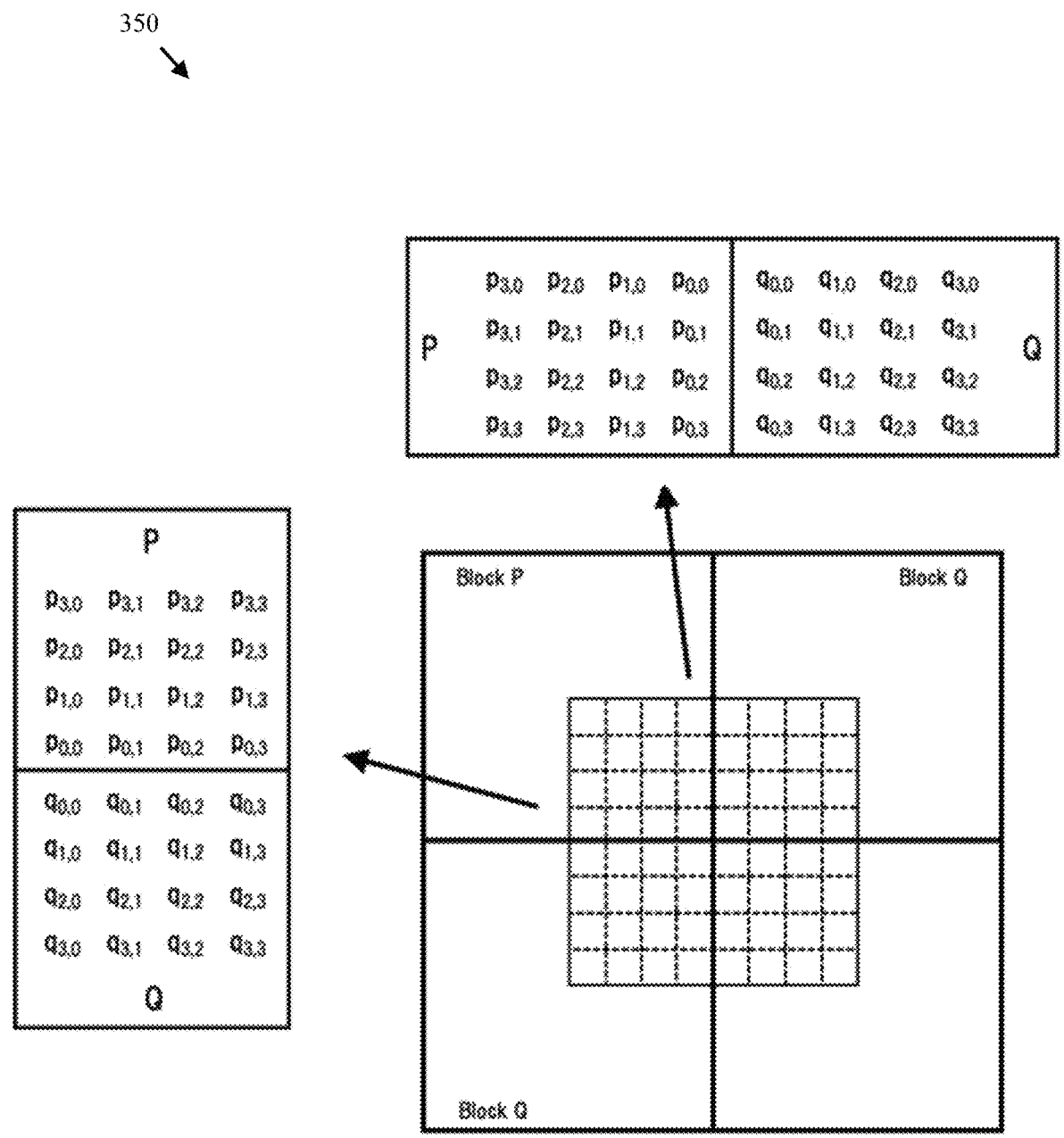
FIG. 3B is a diagram of an exemplary boundary strength derivation process, according to an embodiment.

In HEVC, the filter strength of the deblocking filter may be controlled by the variables β and tC which are derived from the averaged quantization parameters qPL. In the VTM5, deblocking filter may control the strength of the deblocking filter by adding offset to qPL according to the luma level of the reconstructed samples. The reconstructed luma level LL is derived as shown in Eqn (1), and where the sample values pi,k and qi,k with i=0 . . . 3 and k=0 and 3 are derived as shown in FIG. 3B.

$$LL=((p0,0+p0,3+q0,0+q0,3)\gg 2)/(1\ll bitDepth) \quad \text{Eqn (1)}$$

The variable qPL may be derived as shown in Eqn (2) where QpQ and QpP denote the quantization parameters of the coding units containing the sample q0,0 and p0,0, respectively. The offset qpOffset dependent on transfer function, the values may be signalled in the SPS.

$$qP_L=((Qp_Q+Qp_P+1)\gg 1)+qpOffset \quad \text{Eqn (2)}$$

In VTM5, Maximum QP was changed from 51 to 63, and it is desired to reflect corresponding change to deblocking table, which derive values of deblocking parameters tC based on the block QP, The following is updated tC table to accommodate the extension of the QP range.

$$tC=[0,0,0,0,0,0,0,0,0,0,0,0,0,0,0,0,0,0,1,1,1,1,1,1,1,1,$$
$$1,2,2,2,2,3,3,3,3,4,4,4,5,5,6,6,7,8,9,10,11,13,14,$$
$$16,18,20,22,25,28,31,35,39,44,50,56,63,70,79,$$
$$88,99]$$

Deblocking Filter for Luma

A bilinear filter (stronger deblocking filter) is used when samples at either one side of a boundary belong to a large block. A sample belonging to a large block is defined as when the width is larger than or equal to 32 for a vertical edge, and when height is larger than or equal to 32 for a horizontal edge. Block boundary samples pi for i=0 to Sp-1 and qi for j=0 to Sq-1 are then replaced by linear interpolation as follows:

$$p_i'=(f_i+\text{Middle}_{s,t}+(64-f_i)*P_s+32)\gg 6), \text{clipped to}$$
$$p_i\pm tcPD_i \quad \text{Eqn (3)}$$

$$q_j'=(g_j*\text{Middle}_{s,t}+(64-g_j)*Q_s+32)\gg 6), \text{clipped to}$$
$$q_j\pm tcPD_j \quad \text{Eqn (4)}$$

where tcPD$_i$ and tcPD$_j$ term is a position dependent clipping and $g_j$, $f_i$, Middle$_{s,t}$, P$_s$ and Q$_s$ are given below:

TABLE 1

Derivation of stronger deblocking parameters for luma

| Sp, Sq | |
|---|---|
| 7, 7 (p side: 7, q side: 7) | $f_i$ = 59 − i * 9, can also be described as f = {59, 50, 41, 32, 23, 14, 5} |
| | $g_j$ = 59 − j * 9, can also be described as g = {59, 50, 41, 32, 23, 14, 5} |
| | Middle$_{7,7}$ = (2 * (p$_o$ + q$_o$) + p$_1$ + q$_1$ + p$_2$ + q$_2$ + p$_3$ + q$_3$ + p$_4$ + q$_4$ + p$_5$ + q$_5$ + p$_6$ + q$_6$ + 8) >> 4 |
| | P$_7$ = (p$_6$ + p$_7$ + 1) >> 1, Q$_7$ = (q$_6$ + q$_7$ + 1) >> 1 |
| 7, 3 (p side: 7 q side: 3) | $f_i$ = 59 − i * 9, can also be described as f = {59, 50, 41, 32, 23, 14, 5} |
| | $g_j$ = 53 − j * 21, can also be described as g = {53, 32, 11} |
| | Middle$_{7,3}$ = (2* (p$_o$ + q$_o$) + q$_o$ + 2 * (q$_1$ + q$_2$) + p$_1$ + q$_1$ + p$_2$ + p$_3$ + p$_4$ + p$_5$ + p$_6$ + 8) >> 4 |
| | P$_7$ = (p$_6$ + p$_7$ + 1) >> 1, Q$_3$ = (q$_2$ + q$_3$ + 1) >> 1 |
| 3, 7 (p side: 3 q side: 7) | $g_j$ = 59 − j * 9, can also be described as g = {59, 50, 41, 32, 23, 14, 5} |
| | $f_i$ = 53 − i * 21, can also be described as f = {53, 32, 11} |
| | Middle$_{3,7}$ = (2* (q$_o$ + p$_o$) + p$_o$ + 2 * (p$_1$ + p$_2$) + q$_1$ + p$_1$ + q$_2$ + q$_3$ + q$_4$ + q$_5$ + q$_6$ + 8) >> 4 |
| | Q$_7$ = (q$_6$ + q$_7$ + 1) >> 1, P$_3$ = (p$_2$ + p$_3$ + 1) >> 1 |

TABLE 1-continued

Derivation of stronger deblocking parameters for luma

| | |
|---|---|
| 7, 5 (p side: 7 q side: 5) | $g_j = 58 - j * 13$, can also be described as $g = \{58, 45, 32, 19, 6\}$<br>$f_i = 59 - i * 9$, can also be described as $f = \{59, 50, 41, 32, 23, 14, 5\}$<br>Middle7, 5 = $(2 * (p_o + q_o + p_1 + q_1) + q_2 + p_2 + q_3 + p_3 + q_4 + p_4 + q_5 + p_5 + 8) \gg 4$<br>$Q_5 = (q_4 + q_5 + 1) \gg 1$, $P_7 = (p_6 + p_7 + 1) \gg 1$ |
| 5, 7 (p side: 5 q side: 7) | $g_j = 59 - j * 9$, can also be described as $g = \{59, 50, 41, 32, 23, 14, 5\}$<br>$f_i = 58 - i * 13$, can also be described as $f = \{58, 45, 32, 19, 6\}$<br>Middle5, 7 = $(2 * (q_o + p_o + p_1 + q_1) + q_2 + p_2 + q_3 + p_3 + q_4 + p_4 + q_5 + p_5 + 8) \gg 4$<br>$Q_7 = (q_6 + q_7 + 1) \gg 1$, $P_5 = (p_4 + p_5 + 1) \gg 1$ |
| 5, 5 (p side: 5 q side: 5) | $g_j = 58 - j * 13$, can also be described as $g = \{58, 45, 32, 19, 6\}$<br>$f_i = 58 - i * 13$, can also be described as $f = \{58, 45, 32, 19, 6\}$<br>Middle5, 5 = $(2 * (q_o + p_o + p_1 + q_1 + q_2 + p_2) + q_3 + p_3 + q_4 + p_4 + 8) \gg 4$<br>$Q_5 = (q_4 + q_5 + 1) \gg 1$, $P_5 = (p_4 + p_5 + 1) \gg 1$ |
| 5, 3 (p side: 5 q side: 3) | $g_j = 53 - j * 21$, can also be described as $g = \{53, 32, 11\}$<br>$f_i = 58 - i * 13$, can also be described as $f = \{58, 45, 32, 19, 6\}$<br>Middle5, 3 = $q_o + p_o + p_1 + q_1 + q_2 + p_2 + q_3 + p_3 + 4) \gg 3$<br>$Q_3 = (q_2 + q_3 + 1) \gg 1$, $P_5 = (p_4 + p_5 + 1) \gg 1$ |
| 3, 5 (p side: 3 q side: 5) | $g_j = 58 - j * 13$, can also be described as $g = \{58, 45, 32, 19, 6\}$<br>$f_i = 53 - i * 21$, can also be described as $f = \{53, 32, 11\}$<br>Middle3, 5 = $(q_o + p_o + p_1 + q_1 + q_2 + p_2 + q_3 + p_3 + 4) \gg 3$<br>$Q_5 = (q_4 + q_5 + 1) \gg 1$, $P_3 = (p_2 + p_3 + 1) \gg 1$ |

Above mentioned stronger luma filters may be used only if all of the Condition1, Condition2 and Condition 3 are TRUE. The condition 1 is the "large block condition". This condition detects whether the samples at P-side and Q-side belong to large blocks. The condition 2 and condition 3 may be:

Condition2=$(d<\beta)$?TRUE:FALSE

Condition3=StrongFilterCondition= (dpq is less than $(\beta\gg2)$, $sp_3+sq_3$ is less than $(3*\beta\gg5)$, and Abs $(p_0-q_0)$ is less than $(5*t_C+1)\gg1)$? TRUE: FALSE unit of chroma sample), and the following decision with three conditions are satisfied. The first one is for decision of boundary strength as well as large block. The second and third one are the same as for HEVC luma decision, which are on/off decision and strong filter decision, respectively. In the first decision, boundary strength (Bs) is modified for chroma filtering as shown in Table 2. The condition in Table 1 are checked sequentially. If a condition is satisfied, then the remaining conditions with lower priorities are skipped.

TABLE 2

The modified boundary strength

| Priority | Conditions | Y | U | V |
|---|---|---|---|---|
| 5 | At least one of the adjacent blocks is intra | 2 | 2 | 2 |
| 4 | At least one of the adjacent blocks has non-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Deblocking Filter for Chroma

In some embodiments, the following strong deblocking filter for chroma may be defined as shown in Eqn (5)-(7).

$$p_2'=(3*p_3+2*p_2+p_1+p_0+q_0+4)\gg3 \quad \text{Eqn (5)}$$

$$p_1'=(2*p_3+p_2+2*p_1+p_0+q_0+q_1+4)\gg3 \quad \text{Eqn (6)}$$

$$p_0'=(p_3+p_2+p_1+2*p_0+q_0+q_1+q_2+4)\gg3 \quad \text{Eqn (7)}$$

The above disclosed chroma filter may perform deblocking on a 8x8 chroma sample grid. The chroma strong filters may be used on both sides of the block boundary. In some embodiment, the chroma filter may be selected when both sides of the chroma edge are greater than or equal to 8 (in Chroma deblocking may be performed when Bs is equal to 2, or Bs is equal to 1 when a large block boundary is detected. The second and third condition may be the same as HEVC luma strong filter decision.

Deblocking Filter for Subblock Boundary

In VVC, deblocking filter may be enabled on 4x4 grid for luma, and 8x8 grid for chroma. The deblocking filtering process may be applied to the CU boundaries as well as the subblock boundaries. The subblock boundaries may include the prediction unit boundaries introduced by subblock temporal motion vector prediction (STMVP) and affine modes, and the transform unit boundaries introduced by subblock transform (SBT) and intra-subpartitioning (ISP) modes.

In some embodiments, for SBT and ISP subblocks, the same logic as TU in HEVC deblocking filter may be applied. The deblocking filter may be applied to TU boundary when there are non-zero coefficients in either subblock across the edge. For SbTMVP and affine subblocks on 4x4 grid, the same logic as PU in HEVC deblocking filter may be applied. For PU boundaries, the deblocking filter may be applied with the consideration of the difference between motion vectors and reference pictures of the neighboring subblock.

Aspects of the present disclosure are directed to a neural network-based deblocking filters for NIC, specifically, deblocking filter mechanism for block-wise NIC to deblock artifact areas in the block boundary.

Figure 4A:
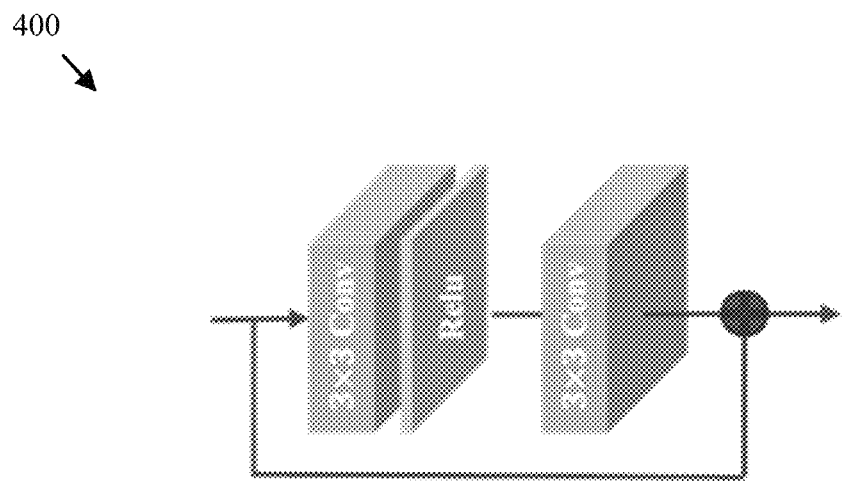
FIG. 4A-B are diagrams that illustrate exemplary structures for neural network based deblocking filters, according to an embodiment.
Figure 4B:
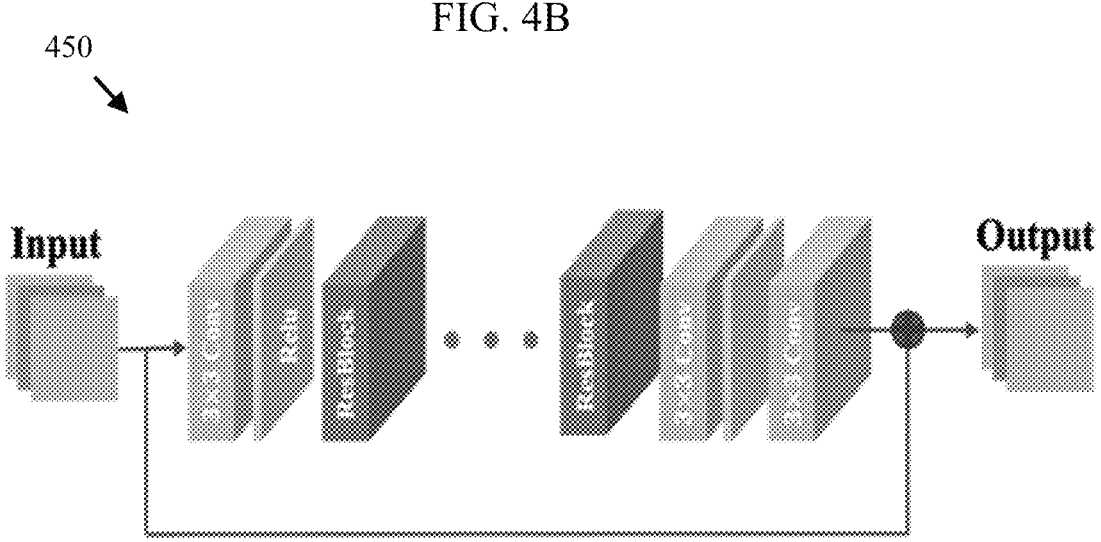

The deblocking filters may be applied on the Decoder side of NIC. A reconstructed image by a block-wise NIC contains artifact among the blocks. Deblocking filters, as proposed in the present disclosure, may be used to minimize such artifacts. A deblocking DNN may include of a set of convolution layers, or residual layers. An example of a residual block is block diagram 400 in FIG. 4A. The DNN used by image super-resolution may be used here (e.g., by changing the output size to be the same with the input size). An example of a network of residual blocks forming a neural network-based deblocking filter is block diagram 450 in FIG. 4B.

It may be understood that the present disclosure does not place any restrictions on the specific network structures for image compression method or deblocking filters. Additionally, the present disclosure does not place any restrictions on the block size, how to split an image to blocks as well as the deblock order of the artifacts areas.

In some embodiments, as an example, a block-wise image compression, the reconstructed blocks forms x' that contains artifact among the boundaries of blocks. Then entire x' (or partial artifacts areas in x') may be sent to a deblocking DNN that is used to minimize such artifacts and to generate x.

Figure 6A:
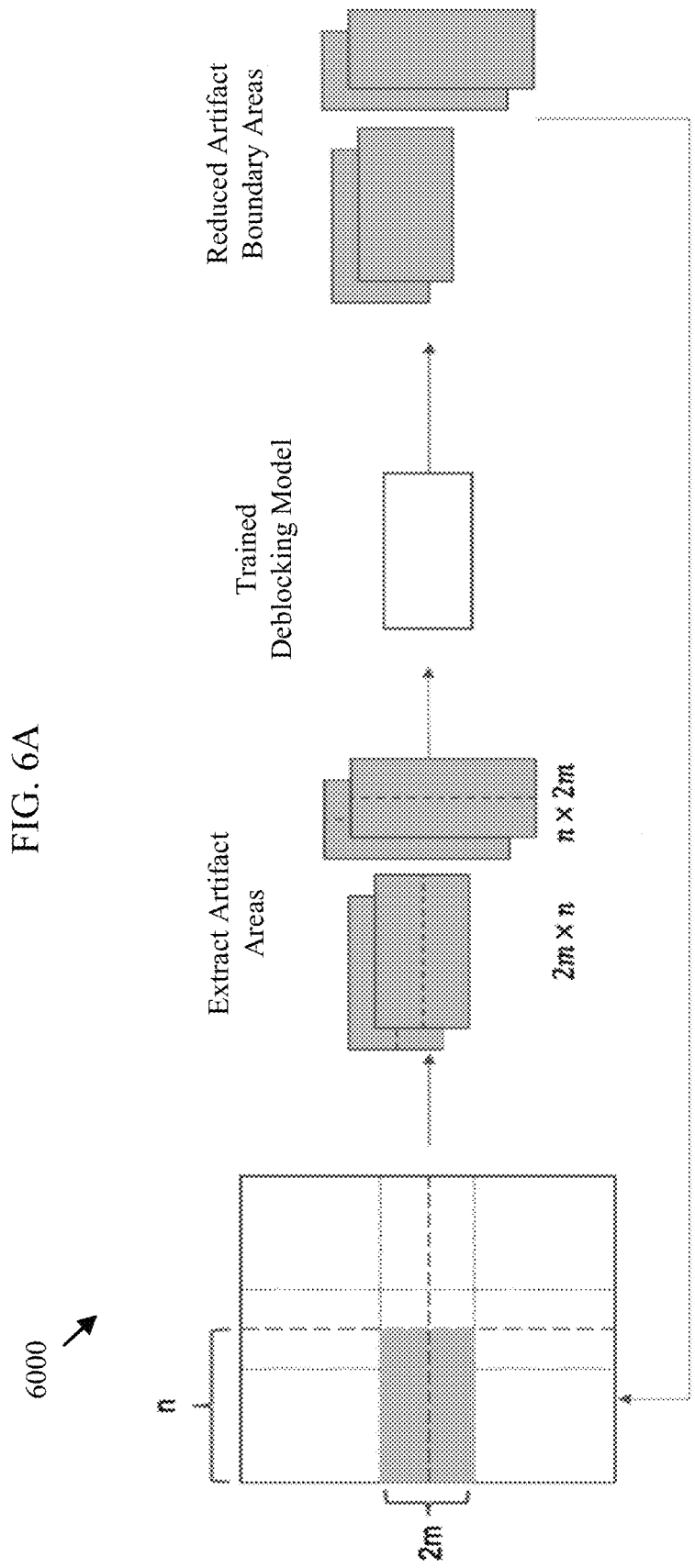
FIG. 6A-C are workflow diagrams that illustrate exemplary processes to reduce artifacts in a compressed image using a neural-network based deblocking filter, according to an embodiment.

Deblocking methods as disclosed herein may be used to reduce the artifacts among blocks. FIG. 6A illustrates an exemplary workflow 6000 of an embodiment of a neural network based deblocking module. For ease of depiction, there are only four equal-sized blocks in FIG. 6A. It may be understood that the image may be partitioned into a large number of blocks, and the size of each block may be different.

To reduce the artifacts among the blocks (in the block boundary areas), a DNN-based deblocking model may be used. In one embodiment, one or more entire reconstructed images may be sent to the deblocking model. By default, the entire boundary area may be used as input to deblocking module and also the output of the deblocking module. The samples in the output boundary area may be used to replace the samples before the deblocking module to generate a reduced artifact reconstructed image.

Figure 5A:
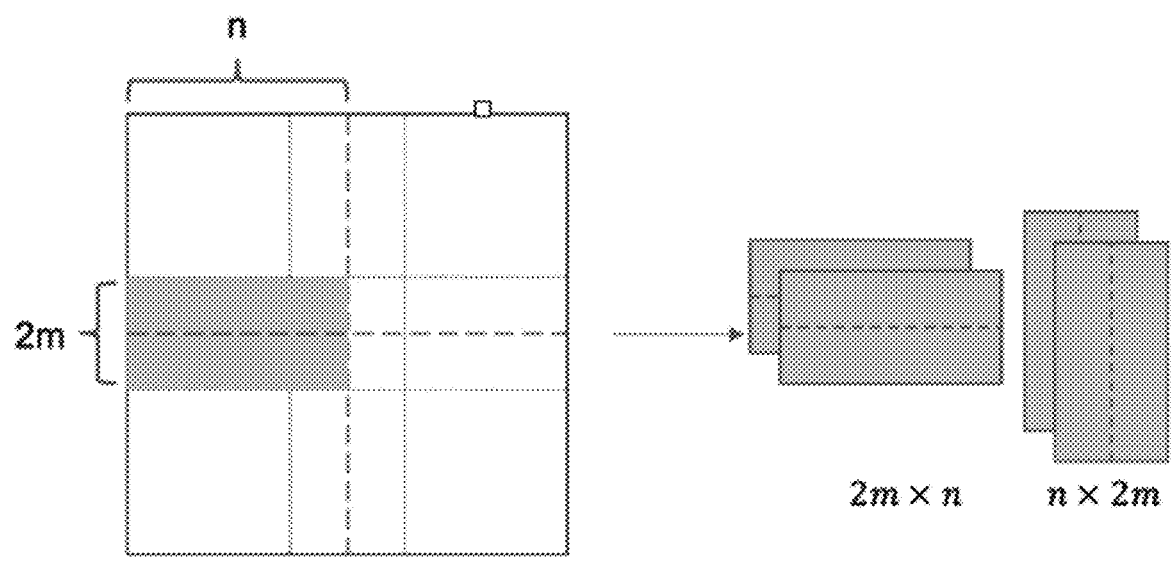
FIG. 5A-B are diagrams that illustrate exemplary processes to extract boundary areas, according to an embodiment.
Figure 5B:
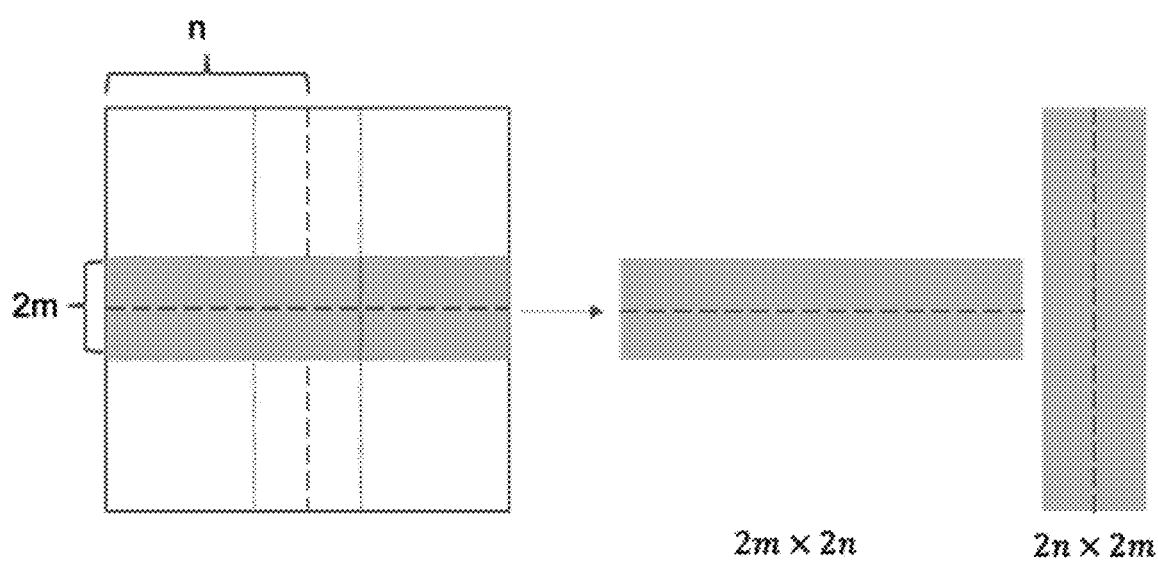

According to an aspect of the present disclosure, the areas that contain artifacts induced by the adjacent blocks may be extracted (denoted herein as boundary area). As shown in FIG. 6A and FIG. 5A, the boundary area may consist of two sub-areas from two adjacent blocks, and the size of an boundary areas may be 2m×n or n×2m, where n is the length of the block and m is the height of area took from a block. The value of m may vary as an integer number. As an example, it could be 4 pixels. The boundary areas may be sent to deblocking module to reduce artifacts. Then the deblocked area may updated in the image as shown in FIG. 6A. In FIG. 5A, a boundary area is identified from two adjacent blocks. In some embodiments, the boundary area may also consist of multiple blocks as shown in FIG. 5B.

Figure 6B:
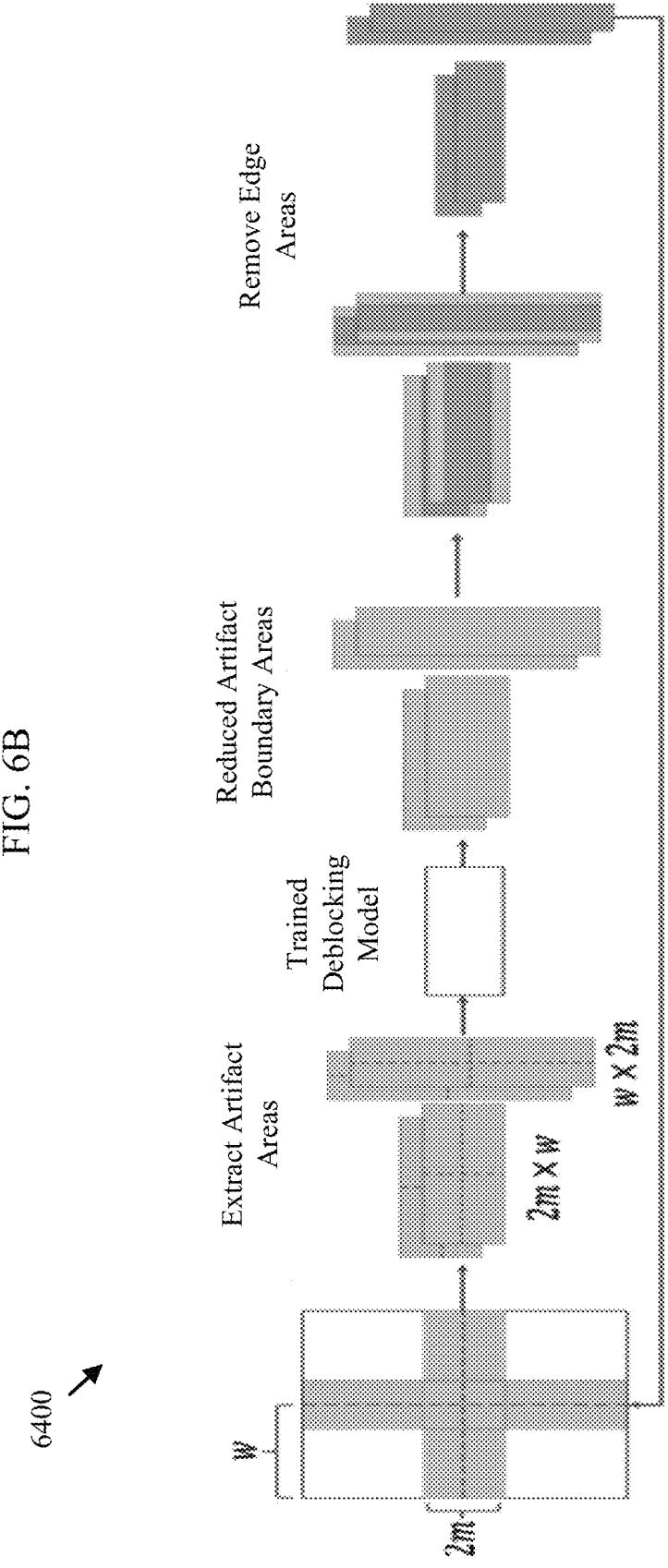

According to an aspect of the present disclosure, the process to reduce the artifacts among blocks may include removing the edge area of the output of the deblocking model to reduce the blocking effect caused by the deblocking model itself. As an example, as shown in FIG. 6B, process 6400 includes removing the edge area of the output of the deblocking model. As shown in process 6400, the outer part (the lighter grey area) of the boundary area may be removed from applying to the samples prior to deblocking filter. In other words, the output size of the deblocking may be smaller than the input size, where the removed part comes from the outer regions of the input boundary area (both sides). The size of removed edge area out from the boundary area may be varied in different embodiments. In an embodiment, a fixed size (length) of the removed edge area may be used, such as 4 samples wide at both sides. In some embodiments, the size (length) of the removed edge area may be specified in the bitstream at a high level syntax, such as picture level, sequence level, or the like.

Figure 6C:
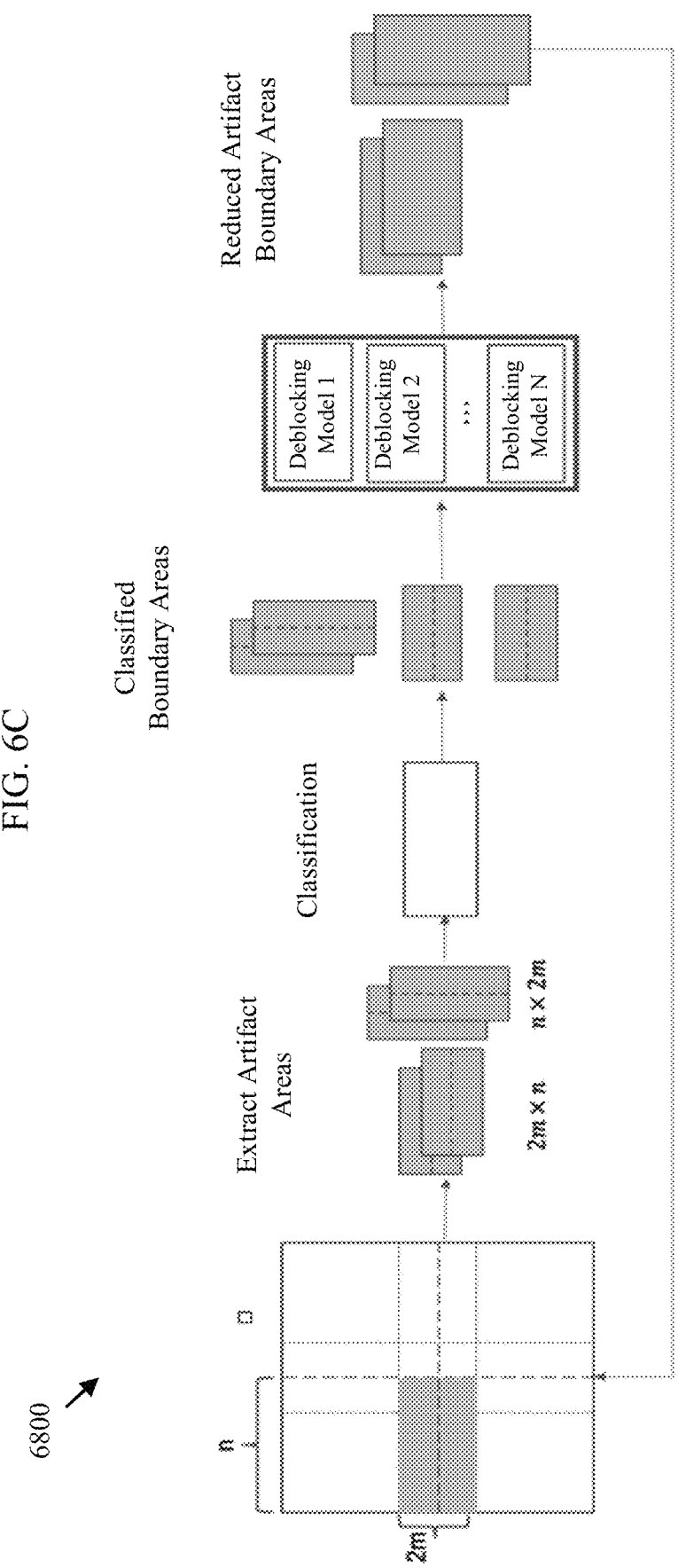

FIGS. 6A-B disclose embodiments that use a single deblocking model to improve the boundary areas. FIG. 6C illustrates a process 6800 for artifact reduction among blocks using a plurality of neural network based deblocking modules. Process 6800 may include utilizing specific deblocking models for specific type of boundary areas to more efficiently remove and/or reduce artifacts.

As shown in process 6800, once the boundary area is extracted, a classification module (DNN-based model, or the traditional methods used in video codec, or simply the variance) may be used to classify the boundary areas into different categories. Then, boundary areas may be sent to different deblocking models according to their categories. In some embodiments, the extracted boundary area may be defined based on one of (1) the content of the boundary area and (2) the strength of the artifact. As an example, a boundary area with high frequency content may be sent to a model different from the model designed for deblocking low frequency content. In some embodiments, the frequency of an area may be measured by the maximum difference of different samples within the area. In one example, the difference of samples near the edge in one side of the boundary may be measured; in another example, the difference of samples near the edge in the other side of the boundary may also be measured.

It may be understood that the boundary area in multi-model deblocking module are not limited to what is described in FIGS. 6A-C. The deblocking area described in FIGS. 6A-B may also use the multi-model deblocking method.

Each of the processes 6000, 6400, and 6800 are embodiments for removing artifacts in reconstructed images of block-wise NIC. The goal may be to deblock the pixels closer to the boundary than pixels away from the boundary. The deblocking model may include comprises of a few convolution layers or residual layers. CNN-based attention mechanism (e.g., Non-local attention, SEnet) and Residual net (including a set of convent and an activation function) may be used.

In some embodiments, the encoder and decoder may be able to select in between a conventional deblocking methods or the neural-network based deblocking methods disclosed herein. The selection decision may be made on various levels, such as at slice/picture level, for a group of pictures or on sequence level. The selection may also be made by sending a signaling flag or inferred from analyzing the content.

In some embodiments, the encoder and decoder may be able to apply various level of boundary strength on top of the proposed method, assuming the DNN derived adjustments on pixels are at the default level of boundary strength. By analyzing the boundary conditions and block coding features, different level of Bs may be assigned to enlarge or reduce the default adjustment.

The one or more deblocking models (e.g., deblocking DNNs) may be trained according to embodiments of the present disclosure. In an embodiment, the weight coefficients deblocking DNNs may be initialized, by e.g., using pre-trained corresponding DNN models, or by setting them to random numbers. Then, given an input training image x, it may be passed through the block-wise NIC network to get the reconstructed image x with block artifacts. Then extracted areas of the block artifacts may be sent to the deblocking DNNs as the input. To achieve better reconstruction quality, a quality loss function my be used to measure the reconstruction quality, which may be the distortion loss, such as the traditional PSNR, MS-SSIM, or a weighted combination of both.

In an embodiment, the input of deblocking DNN may be vertical areas or horizontal areas. In other embodiments, the input of deblocking DNN may be only vertical areas or only horizontal areas. In some embodiments, the operation of transposition may be applied to extracted boundary artifacts areas that are used as input to the deblocking DNNs and the output of the deblocking DNNs may be transposed back to the original shape.

In an embodiment, training data may include the reconstructed image x that may be generated by the estimated compression by a NIC network. In another embodiment, the reconstructed image x may be generated by the actual compression by a NIC network. In an embodiment, the reconstructed image x may be rounded right after the NIC compression and then the block artifacts areas may be selected as an input to the deblocking DNN. In another embodiment, the reconstructed image x may not be rounded, and the block artifacts may be selected after the NIC compression without any quantization.

Figure 7:
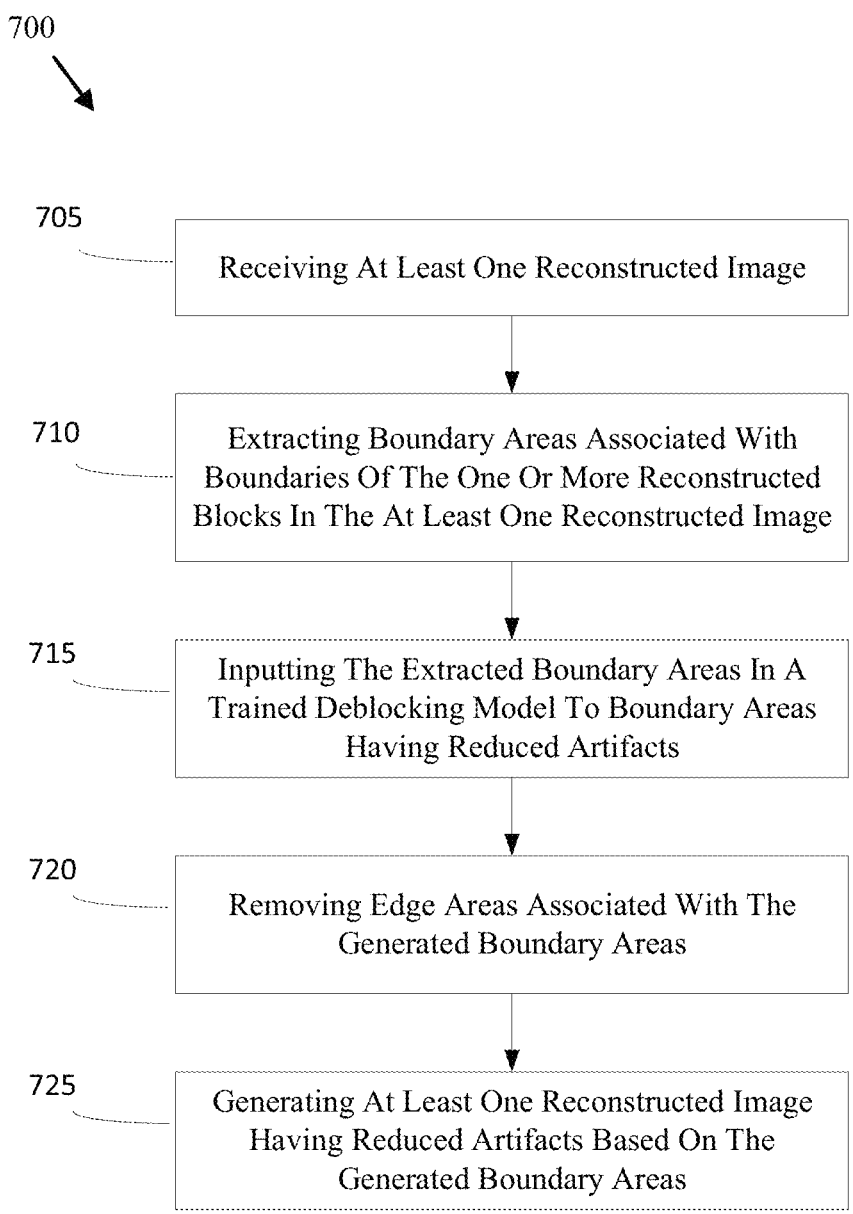
FIG. 7 is a flowchart of process for reducing artifacts in a compressed image using a neural-network based deblocking filter, according to an embodiment.

FIG. 7 illustrates a flowchart for an exemplary process 700 for reducing artifacts in a compressed image using a neural-network based deblocking filter, according to an embodiment.

At operation 705, at least one reconstructed image may be received. In some embodiments, each reconstructed image comprises one or more reconstructed blocks.

At operation 710, boundary areas associated with boundaries of the one or more reconstructed blocks in the at least one reconstructed image may be extracted. In some embodiments, the extracted boundary areas may include at least two sub-areas from at least two adjacent blocks among the one or more reconstructed blocks At operation 715, the extracted boundary areas may be input in a trained deblocking model to generate artifact reduced boundary areas (also referred to as generated boundary areas having reduced artifacts or generated boundary areas that reduce artifacts in the disclosure). In some embodiments, the extracted boundary areas being input in the trained deblocking model may include classifying respective extracted boundary area among the extracted boundary areas into categories based on at least one of a content of the respective extracted boundary area or a strength of artifacts in the respective extracted boundary area. In some embodiments, based on the classification, the respective boundary area may be input in a respective trained deblocking model among one or more trained deblocking models to generate the artifact reduced boundary areas. In some embodiments, the trained deblocking model is trained on training data based on estimated compression by a neural image compression (NIC) network.

In some embodiments, the trained deblocking model is a neural network based model. In some embodiments, the trained deblocking model may be trained based on a quality loss function measuring reconstruction quality. The training data may include vertical extracted boundary areas and horizontal extracted boundary areas from at least one of reconstructed images generated using estimated compression by a first neural-network based image compression network, reconstructed images generated using actual compression by a second neural-network based image compression network, or reconstructed images that are rounded after being generated by a third neural-network based image compression network.

At operation 720, edge areas associated with the artifact reduced boundary areas may be removed. In some embodiments, removing the edge areas may include removing the edge areas based on a pre-defined size, and wherein the pre-defined size is signaled in a bitstream at a high level syntax.

At operation 725, at least one reduced artifact reconstructed image (also referred to as reconstructed image having reduced artifacts in the disclosure) may be generated based on the artifact reduced boundary areas. In some embodiments, generating the at least one reduced artifact reconstructed image may include replacing boundary areas corresponding to the artifact reduced boundary areas in the at least one reconstructed image to generate the at least one reduced artifact reconstructed image.

Figure 8:
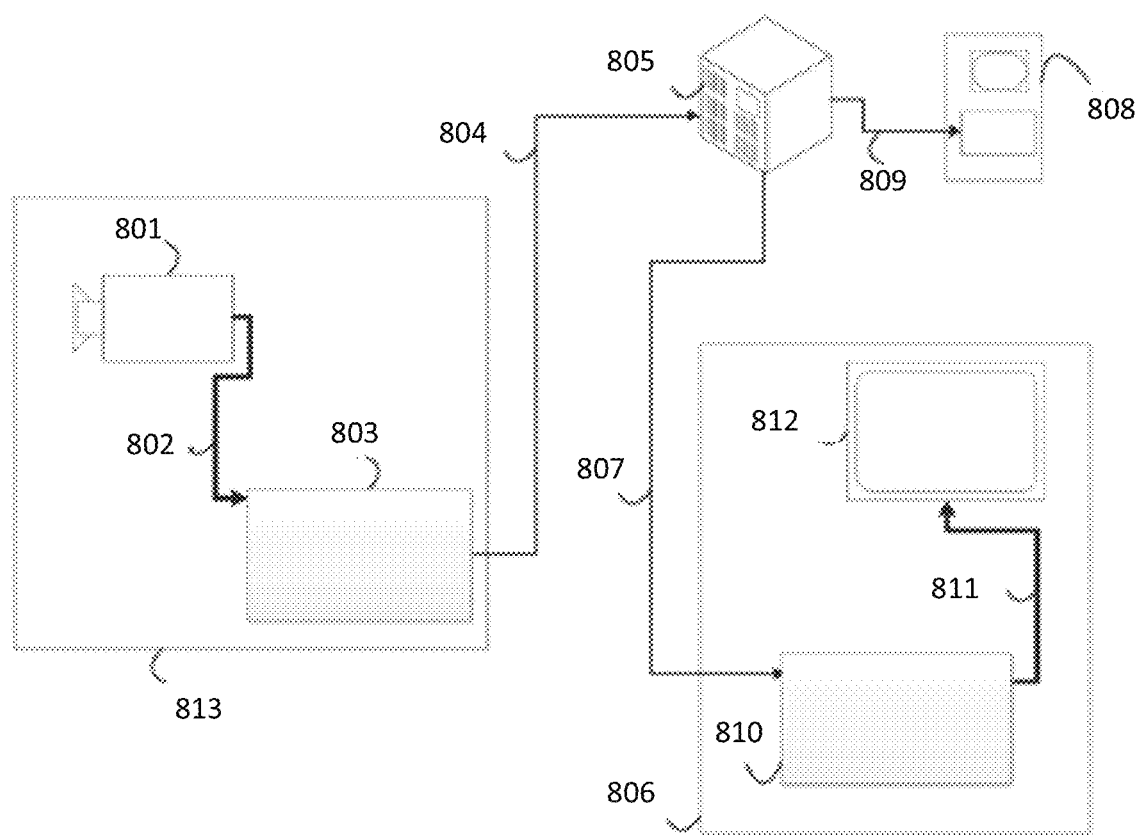
FIG. 8 is a diagram of a video coding and decoding environment, according to an embodiment.

FIG. 8 illustrates, as an example for an application 800 for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

A streaming system may include a capture subsystem 813, that may include a video source 801, for example a digital camera, creating, for example, an uncompressed video sample stream 802. That sample stream 802, depicted as a bold line to emphasize a high data volume when compared to encoded video bitstreams, may be processed by an encoder 803 coupled to the camera 801. The encoder 803 may include hardware, software, or a combination thereof to enable or implement aspects of the disclosed subject matter as described in more detail below. The encoded video bitstream 804, depicted as a thin line to emphasize the lower data volume when compared to the sample stream, may be stored on a streaming server 805 for future use. One or more streaming clients 806, 808 may access the streaming server 805 to retrieve copies 807, 809 of the encoded video bitstream 804. A client 806 may include a video decoder 810 which decodes the incoming copy of the encoded video bitstream 807 and creates an outgoing video sample stream 811 that may be rendered on a display 812 or other rendering device. In some streaming systems, the video bitstreams 804, 807, 809 may be encoded according to certain video coding/compression standards. Examples of those standards include H.265 HEVC. Under development is a video coding standard informally known as Versatile Video Coding (VVC). The disclosed subject matter may be used in the context of VVC.

Embodiments of the present disclosure provide a flexible and general framework that accommodates various types of quality metrics.

The techniques of embodiments of the present disclosure described above, can be implemented as computer software using computer-readable instructions and physically stored in one or more computer-readable media. For example, FIG. 9 shows a computer system 900 suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, and camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 900 having architecture, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940.

A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for reducing artifacts in a compressed image using a neural network based deblocking filter, the method being executed by at least one processor, and the method comprising:
   receiving at least one reconstructed image, wherein each reconstructed image comprises one or more reconstructed blocks;
   extracting boundary areas associated with boundaries of the one or more reconstructed blocks in the at least one reconstructed image;
   inputting the extracted boundary areas in a trained deblocking model to generate boundary areas that reduce artifacts, wherein the trained deblocking model is trained on training data based on estimated compression by a neural image compression (NIC) network, wherein the inputting the extracted boundary areas in the trained deblocking model comprises:
   classifying a respective extracted boundary area among the extracted boundary areas into categories based on at least one of a content of the respective extracted boundary area or a strength of artifacts in the respective extracted boundary area;
   based on the classification, inputting the respective boundary area in a respective trained deblocking model among one or more trained deblocking models to generate the generated boundary areas;
   removing edge areas associated with the generated boundary areas; and
   generating at least one reconstructed image having reduced artifacts based on the generated boundary areas.

2. The method of claim 1, wherein the extracted boundary areas comprise at least two sub-areas from at least two adjacent blocks among the one or more reconstructed blocks.

3. The method of claim 1, wherein removing the edge areas comprises removing the edge areas based on a pre-defined size, and wherein the pre-defined size is signaled in a bitstream at a high level syntax.

4. The method of claim 1, wherein the training data comprises reconstructed images generated by estimated compression by the NIC network or actual compression by the NIC network.

5. The method of claim 1, wherein the trained deblocking model is trained based on a quality loss function measuring reconstruction quality, and wherein training data includes vertical extracted boundary areas and horizontal extracted boundary areas from at least one of reconstructed images generated using estimated compression by a first neural-network based image compression network, reconstructed images generated using actual compression by a second neural-network based image compression network, or reconstructed images that are rounded after being generated by a third neural-network based image compression network.

6. The method of claim 1, wherein generating the at least one reconstructed image having reduced artifacts comprises replacing boundary areas corresponding to the generated boundary areas in the at least one reconstructed image to generate the at least one reconstructed image having reduced artifacts.

7. A system for reducing artifacts in a compressed image using a neural-network based deblocking filter, the system comprising:
   at least one memory configured to store computer program code; and
   at least one processor configured to access the computer program code and operate as instructed by the computer program code, the computer program code comprising:
   receiving code configured to cause the at least one processor to receive at least one reconstructed image, wherein each reconstructed image comprises one or more reconstructed blocks;
   extracting code configured to cause the at least one processor to extract boundary areas associated with boundaries of the one or more reconstructed blocks in the at least one reconstructed image;
   inputting code configured to cause the at least one processor to input the extracted boundary areas in a trained deblocking model to generate boundary areas that reduce artifacts, wherein the trained deblocking model is trained on training data based on estimated compression by a neural image compression (NIC) network, wherein the inputting code further comprises:

classifying code configured to cause the at least one processor to classify respective extracted boundary area among the extracted boundary areas into categories based on at least one of a content of the respective extracted boundary area or a strength of artifacts in the respective extracted boundary area; and second inputting code configured to cause the at least one processor to input, based on the classification, the respective boundary area in a respective trained deblocking model among one or more trained deblocking models to generate the generated boundary areas;

removing code configured to cause the at least one processor to remove edge areas associated with the generated boundary areas; and generating code configured to cause the at least one processor to generate at least one reconstructed image having reduced artifacts based on the generated boundary areas.

8. The system of claim 7, wherein the extracted boundary areas comprise at least two sub-areas from at least two adjacent blocks among the one or more reconstructed blocks.

9. The system of claim 7, wherein the removing code further comprises removing the edge areas based on a pre-defined size, and wherein the pre-defined size is signaled in a bitstream at a high level syntax.

10. The system of claim 7, wherein the trained deblocking model is trained based on a quality loss function measuring reconstruction quality, and wherein training data includes vertical extracted boundary areas and horizontal extracted boundary areas from at least one of reconstructed images generated using estimated compression by a first neural-network based image compression network, reconstructed images generated using actual compression by a second neural-network based image compression network, or reconstructed images that are rounded after being generated by a third neural-network based image compression network.

11. The system of claim 7, wherein the generating code further comprises replacing boundary areas corresponding to the generated boundary areas in the at least one reconstructed image to generate the at least one reconstructed image having reduced artifacts.

12. A non-transitory computer-readable medium storing computer code that is configured to, when executed by at least one processor, cause the at least one processor to implement a neural-network based deblocking filter that:

receives at least one reconstructed image, wherein each reconstructed image comprises one or more reconstructed blocks;

extracts boundary areas associated with boundaries of the one or more reconstructed blocks in the at least one reconstructed image;

inputs the extracted boundary areas in a trained deblocking model to generate boundary areas that reduce artifacts, wherein the trained deblocking model is trained on training data based on estimated compression by a neural image compression (NIC) network, wherein inputting the extracted boundary areas in the trained deblocking model comprises:

classifying respective extracted boundary area among the extracted boundary areas into categories based on at least one of a content of the respective extracted boundary area or a strength of artifacts in the respective extracted boundary area; and based on the classification, inputting the respective boundary area in a respective trained deblocking model among one or more trained deblocking models to generate the generated boundary areas;

removes edge areas associated with the generated boundary areas; and generates at least one reconstructed image having reduced artifacts based on the generated boundary areas.

13. The non-transitory computer-readable medium of claim 12, wherein the extracted boundary areas comprise at least two sub-areas from at least two adjacent blocks among the one or more reconstructed blocks.

14. The non-transitory computer-readable medium of claim 12, wherein removing the edge areas comprises removing the edge areas based on a pre-defined size, and wherein the pre-defined size is signaled in a bitstream at a high level syntax.

15. The non-transitory computer-readable medium of claim 12, wherein the training data comprises reconstructed images generated by estimated compression by the NIC network or actual compression by the NIC network.

16. The non-transitory computer-readable medium of claim 12, wherein the trained deblocking model is trained based on a quality loss function measuring reconstruction quality, and wherein training data includes vertical extracted boundary areas and horizontal extracted boundary areas from at least one of reconstructed images generated using estimated compression by a first neural-network based image compression network, reconstructed images generated using actual compression by a second neural-network based image compression network, or reconstructed images that are rounded after being generated by a third neural-network based image compression network.

17. The non-transitory computer-readable medium of claim 12, wherein generating the at least one reconstructed image having reduced artifacts comprises replacing boundary areas corresponding to the generated boundary areas in the at least one reconstructed image to generate the at least one reconstructed image having reduced artifacts.

* * * * *